United States Patent [19]
Joseph et al.

[11] Patent Number: 5,905,131
[45] Date of Patent: May 18, 1999

[54] ELASTOMER-FORMING COMPOSITIONS

[75] Inventors: Edouard Joseph, Hofheim-Wildsachsen; Klaus Kunz, Gau-Odernheim, both of Germany

[73] Assignee: Dow Corning GmbH, Germany

[21] Appl. No.: 08/722,332

[22] Filed: Sep. 27, 1996

[30] Foreign Application Priority Data

Oct. 4, 1995 [GB] United Kingdom .................... 9520272

[51] Int. Cl.⁶ .................................................. C08G 77/08
[52] U.S. Cl. ............................. 528/18; 525/477; 525/478
[58] Field of Search ...................................... 525/477, 478; 528/18

[56] References Cited

U.S. PATENT DOCUMENTS

| 4,780,338 | 10/1988 | Saad et al. | 525/18 |
| 5,616,673 | 4/1997 | Anderson et al. | 528/18 |

OTHER PUBLICATIONS

Macromolecular Reports, A31 (Suppls. 1&2), 153–160 (1994) article entitled Elastomer Properties of Poly(Dimethylsiloxane) Networks Having Bimodal and Trimodal Distributions of Network.

Chain Lengths, Madkour and Mark Polymer Bulletin 31, 615–621 (1993) entitled Some Evidence on Pore Sizes in Poly(dimethylsiloxane) Elastomers Having Unimodal, Bimodal, or Trimodal Distributions of Network Chain Lengths, Madkour and Mark .

*Primary Examiner*—Melvyn I. Marquis
*Attorney, Agent, or Firm*—Sharon K. Severance

[57] ABSTRACT

Siloxane-based elastomer-forming compositions comprise a first a,w-dihydroxyl polydiorganosiloxane, a second a,w-dihydroxyl polydiorganosiloxane, a third a,w-dihydroxyl polydiorganosiloxane, an organosilicon compound having at least three silicon-bonded substituents selected from the group consisting of hydrogen and alkoxy groups, and a condensation catalyst. The number average molecular weight ratio of the first a,w-dihydroxyl polydiorganosiloxane to the second a,w-dihydroxyl polydiorganosiloxane is in the range of 20 to 80 and the number average molecular weight ratio of second a,w-dihydroxyl polydiorganosiloxane to the third a,w-dihydroxyl polydiorganosiloxane is in the range of 1 to 6. The molar ratio of the first a,w-dihydroxyl polydiorganosiloxane to the second a,w-dihydroxyl polydiorganosiloxane is in the range of 0.01 to 0.15 and the molar ratio of the second a,w-dihydroxyl polydiorganosiloxane to the third a,w-dihydroxyl polydiorganosiloxane is in the range of 0.2 to 2. These compositions are substantially solvent-free and result in elasomers having improved strength without fillers.

19 Claims, No Drawings

ELASTOMER-FORMING COMPOSITIONS

The present invention relates to elastomer-forming compositions, more specifically siloxane-based elastomer-forming compositions which are substantially free from organic solvents and which show improved strength without the use of reinforcing filler particles.

In some applications it is important that siloxane elastomeric materials are provided, which have a good mechanical strength, but which do not have a high viscosity prior to curing to the elastomeric phase. Systems have been provided which have a relatively low viscosity before curing, and give a high strength when cured to elastomeric form, but they tend to use organic solvent materials to reduce the inherent viscosity of elastomer-forming siloxane compositions which have been formulated with reinforcing filler particles. There is a need to provide compositions which achieve a low viscosity prior to curing to an elastomer form, without the use of organic solvents, which are environmentally undesirable, but which retain good mechanical properties.

Some systems have been suggested by Madkour and Mark in Polymer Bulletin 31, 615–621, 1994 and in Macromolecular Reports A31, 153–160, 1994. Suggested systems include what are referred to a bimodal systems, in which a mixture of functionally-terminated polydimethyl siloxanes were used and end-linked. Trimodal systems were also prepared and tested (using three specified different molecular weight siloxane polymers), but the authors state that although "changing from a unimodal distribution to a bimodal distribution significantly improves mechanical properties, changing from a bimodal distribution to a trimodal distribution does not give a further improvement in properties and may actually be detrimental".

We have now found that by carefully selecting the components of a trimodal distribution and their ratios, substantial improvements can be obtained.

According to the invention there is provided a siloxane-based elastomer-forming composition comprising (A) a first α,ω-dihydroxyl polydiorganosiloxane, (B) a second α,ω-dihydroxyl polydiorganosiloxane, (C) a third α,ω-dihydroxyl polydiorganosiloxane, (D) an organosilicon compound having at least three silicon-bonded hydrogen or alkoxy groups and (E) a condensation catalyst, characterized in that the number average molecular weight ratio of A/B is in the range of 20 to 80, the number average molecular weight ratio of B/C is in the range of 1 to 6, the molar ratio of A/B is in the range of 0.01 to 0.15 and the molar ratio of B/C is in the range of 0.2 to 2.

Each of the components of the compositions according to the invention is known and commercially available, and will be described in more detail below.

Components (A), (B) and (C) are α,ω-dihydroxyl polydiorganosiloxanes, which are substantially linear materials having an average general formula (I)

(I)

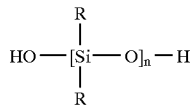

wherein R denotes an organic group, preferably a hydrocarbon group, more preferably an alkyl group or an aryl group, e.g. methyl, ethyl, n-propyl, isobutyl, n-hexyl, n-octodecyl, and n is an integer. R may be saturated or unsaturated, aliphatic or aromatic, but is preferably a group having up to 8 carbon atoms, most preferably no more than 3 carbon atoms. It is particularly preferred that at least 80% of all R groups are alkyl groups, preferably methyl groups.

Most preferred are α,ω-dihydroxyl polydimethyl siloxanes. Such siloxane materials are well known and are commercially available with a wide range of chain lengths and molecular weights. The actual molecular weight of the materials used is not most important. The ratio of molecular weight of the different components (A), (B) and (C) is however very important. The ratio of number average molecular weight of A/B is from 20 to 80, preferably 30 to 50, and of B/C is from 1 to 6, preferably 2 to 4. From the conditions indicated above, it is clear that component (A) will have the highest molecular weight, and component (C) the lowest, thus making (A) the longest polymer and (C) the shortest. It is, however, preferred that component (A) has a number average molecular weight of from 20,000 to 500,000, preferably 50,000 to 200,000, and that component (C) has a number average molecular weight of from 200 to 3000, preferably 500 to 2500.

Apart from the importance of the ratios of number average molecular weight of the polymers used as components (A) to (C), it is also important that the components (A), (B) and (C) are used in the correct molar proportions. The number of moles used should reflect a ratio of A/B of from 0.01 to 0.15, preferably 0.01 to 0.1, more preferably 0.02 to 0.06, and a ratio of B/C of from 0.2 to 2, preferably 0.5 to 1.5. Values outside the specified ratios tend to give elastomeric siloxane materials which have lower mechanical strength.

Component (D) is an organosilicon compound which functions as a cross-linker for the components (A) to (C) during the curing process, causing a three-dimensional network to form upon curing of the compositions according to the invention. In order to be active as cross-linker, it is important that component (D) has at least three sites per molecule in which it can react with any one of components (A) to (C).

The curing mechanism of elastomer-forming compositions comprising α,ω-dihydroxyl polydiorgano-siloxanes, is preferably a condensation reaction, in which the silanol group of components (A) to (C) react with silicon-bonded hydrogen atoms, releasing hydrogen gas, or with silicon-bonded alkoxy groups, releasing alcohols. Accordingly component (D) has either at least three silicon-bonded hydrogen atoms per molecule or three silicon-bonded alkoxy groups. Component (D) may be silanes or siloxanes and may be a linear, branched or resinous compound.

Where component (D) has silicone-bonded hydrogen atoms, it is preferable that component (D) has the average formula (II)

(II)

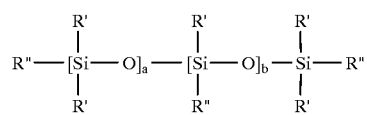

wherein R' denotes a hydrocarbon group having up to 8 carbon atoms, R" denotes a hydrogen atom or a group R', provided at least three R" groups are hydrogen atoms, a has a value of 0 or an integer and b is an integer with a value of at least 1. It is more preferred that component (D) has at least three silicon-bonded alkoxy groups. The most preferred components (D) are either silanes or small resinous siloxanes. Preferred silanes have the general formula R'Si(OR')$_3$ or Si(OR')$_4$, wherein R' is as defined above, preferably alkyl having up to 4 carbon atoms. Examples of suitable silanes include methyltrimethoxy silane, phenyl trimethoxy silane, ethyl tripropoxy silane, hexyl trimethoxy silane, tetra ethoxy silane and tetra n-propoxy silane. Alternatively, but less preferred than silanes, component (D) may be a resinous siloxane, preferably consisting of monovalent siloxane units of the formula $R''_3SiO_{1/2}$ and tetravalent siloxane units of the formula $SiO_{4/2}$, preferably in a ratio of from 0.6/1 to 1.5/1.

The amount of component (D) used has to be sufficient to provide sufficient cross-linking to give the elastomer formed sufficient mechanical strength, while maintaining sufficient flexibility. It is preferred that the ratio of silicon-bonded hydrogen or alkoxy groups of component (D) to silanol groups in components (A), (B) and (C) combined is in the range of from 1/1 to 10/1. For compositions wherein component (D) is a silicon-bonded hydrogen containing compound, the ratio is preferably from 1/1 to 5/1, most preferably 1/1 to 3/1. For compositions where component (D) has silicon-bonded alkoxy groups, the ratio is preferably from 2/1 to 10/1. Component (D) may also comprise more than one organosilicon compound useful as cross-linker for the compositions according to the invention. It has been found that some combinations of different compounds may give improvements in mechanical strength, particularly tear-strength. One such combination is the use of a tetra-alkoxy silane with a trialkoxy silane in a ratio of from 2:1 to 1:2, e.g. tetraethoxy silane and phenyl trimethoxy silane.

Component (E) is a catalyst which encourages the condensation of components (A), (B) and (C) with (D). Any suitable condensation catalysts may be used, preferably metal salts of carboxylic acid, e.g. tin or lead salts. Particularly suitable condensation catalysts are tin or lead salts of octoates or acetates, for example dibutyltin dioctoate, dibutyltin dilaurate, dibutyltin di-ethyl-hexoate, dibutyltin diacetate, lead octoate, lead ethyl-hexoate and lead acetate. Catalysts may be provided as 100% solid materials or may be diluted in suitable solvents or dispersed in suitable dispersion media.

It is preferred to use from 1 to 4% by weight of the catalyst, based on the weight of the total composition, preferably 1.2 to 2%, or from 0.001 to 0.1 molar parts by weight of the actual metal per 100 g of the composition, preferably 0.002 to 0.05 molar parts. Levels as indicated will ensure a good cure, while still maintaining a reasonable pot life of the compositions according to the invention. Particularly preferred for improved pot life are mixtures of tin and lead salts, preferably in a 50/50 weight ratio of the active catalyst species.

Optionally additional ingredients may also be incorporated in compositions according to the invention. One such ingredient is (F) an organosilicon compound having at least three silicon-bonded hydrogen atoms. Although such ingredient is suitable as cross-linking component (D), it may be added in addition to component (D) at a level of 1 to 2% by weight based on the total weight of components (A) to (D). The organosilicon compound (F) will act as a curing accelerator, whichever cross-linking component (D) is used. Preferably the organosilicon compound (F) is added where component (D) is an organosilicon compound having at least three silicon-bonded alkoxy groups.

Where component (D) has silicon-bonded alkoxy groups, it is also beneficial to add component (G), which is an organosilicon resin consisting only of monovalent siloxane units of the formula $R^a_3SiO_{1/2}$ and tetravalent siloxane units of the formula $SiO_{4/2}$ in a ratio of from 0.4/1 to 1.2/1, preferably 0.6/1 to 0.9/1 wherein $R^a$ is an alkyl group, preferably having up to 6 carbon atoms, most preferably methyl, or a hydroxyl group, provided no more than about 5% by weight hydroxyl groups are present on the resin molecule, preferably from 2 to 3% by weight. Component (G) is usually a solid material, and is preferably provided in a suitable solvent, e.g. xylene or toluene, for example as a 50 to 800 solids solution. Where this component (G) is used at high levels, i.e. above 10% by weight based on the total weight of components (A) to (D), preferably above 15%, an improvement in tear strength is also observed.

Other optional ingredients include adhesion promoters, e.g. amino-functional or epoxy-functional organosilicon compounds, colorants, dyes, preservatives, cure inhibitors, fillers, which may be strengthening or non-strengthening fillers or solvents. However, it is preferred to leave out solvents or strengthening fillers, as the invention is particularly concerned with compositions without such ingredients.

Compositions according to the present invention may be prepared by any convenient method, e.g. by mixing of all the ingredients till a homogeneous mixture is obtained. In order to provide a storage stable composition, it is preferred that the ingredients are mixed in two parts, whereby the catalyst (E) is kept separated from the cross-linking component (D), preferably in sealed containers which do not allow ingress of moisture. One suitable way of packing compositions according to the invention is by incorporating part of the mixture of components (A), (B) and (C) with component (E) into a first part and the remainder of the mixture of (A), (B) and (C) with component (D) in a second part, so that mixing parts 1 and 2 in a 1/1 ratio will provide an elastomer forming composition according to the invention. Alternatively component (E) is kept separately and is added as a second part in the desired ratio to the rest of the composition in a first part.

Compositions according to the invention may be cured to elastomers by exposing them to moisture e.g. to air at ambient temperatures.

Cure of the compositions can be accelerated by heating the compositions when applied to appropriate substrates.

Compositions according to the present invention are particularly useful as sealing compounds, e.g. conformal coatings for electronic application or intricate moulding materials. These uses are particularly of interest as the initial viscosity of the compositions can be kept relatively low, allowing easy flow of uncured materials. Viscosities could be as low as 100 mPa.s at 25° C., and are preferably kept below 50,000 mPa.s. Particularly useful viscosities are in the range of 500 to 10,000 mPa.s at 25° C.

There now follow a number of examples and comparative examples which demonstrate the benefits of the compositions according to the invention. All parts and percentages are by weight, unless otherwise indicated. All viscosities are given at 25° C.

In the examples the following compounds were used as ingredients of the compositions. Ingredient (1) was a high viscosity α,ω-dihydroxy polydimethyl siloxane having a number average molecular weight of 100,000 and a viscosity of 50,000 mPa.s. Ingredient (2) was a high viscosity α,ω-dihydroxy polydimethyl siloxane having a number average molecular weight of 146,000 and a viscosity of 360,000 mPa.s. Ingredient (3) was a high viscosity α,ω-dihydroxy polydimethyl siloxane having a number average molecular weight of 71,000 and a viscosity of 13,500 mPa.s. Ingredient (4) was a high viscosity α,ω-dihydroxy polydimethyl siloxane having a number average molecular weight of 62,000 and a viscosity of 10,000 mPa.s. Ingredient (5) was an α,ω-dihydroxy polydimethyl siloxane having a number average molecular weight of 4,600 and a viscosity of 70 mPa.s. Ingredient (6) was an α,ω-dihydroxy polydimethyl siloxane having a number average molecular weight of 38,500 and a viscosity of 2000 mPa.s.

Ingredient (7) was an α,ω-dihydroxy polydimethyl siloxane having a number average molecular weight of 2000 and a viscosity of 40 mPa.s. Ingredient (8) was an α,ω-dihydroxy polydimethyl siloxane having a number average molecular weight of 400 and a viscosity of 20 mPa.s. Ingredient (9) was tetraethoxy silane. Ingredient (10) was phenyltrimethoxy silane. Ingredient (11) was a trimethylsiloxane end-blocked polymethylhydro siloxane having a viscosity of about 30 mPa.s. Ingredient (12) was a trimethylsiloxane end-blocked polymethylhydro siloxane polydimethyl siloxane copolymer having a viscosity of about 5 mPa.s and 0.7% hydrogen. Ingredient (13) was a 50/50 mixture of dibutyltin di-2-ethylhexoate and lead-2-ethylhexoate with some organic solvent. Ingredient (14) is an organosilicon resin consisting only of monovalent siloxane units of the formula $Me_3SiO_{1/2}$ and tetravalent siloxane units of the formula $SiO_{4/2}$ in a ratio of from 0.6/1 to 0.9/1 wherein Me denotes a methyl group.

EXAMPLES 1 to 22

Compositions according to the invention were prepared by mixing together the ingredients according to Table I, wherein components (A), (B) etc. have the same meaning as in the specification in ratios as specified in Table II (where MW means ratio of number average molecular weight and Mol means molar ratio).

TABLE I

| Example | A | B | C | D | E | F | G |
|---|---|---|---|---|---|---|---|
| | | | | Components | | | |
| | | | | Ingredients | | | |
| 1 | 2 | 5 | 7 | 9 | 13 | — | — |
| 2 | 2 | 5 | 7 | 9 | 13 | — | — |
| 3 | 2 | 5 | 7 | 9 | 13 | — | — |
| 4 | 1 | 5 | 7 | 9 | 13 | — | — |
| 5 | 1 | 5 | 7 | 9 + 10 | 13 | — | — |
| 6 | 1 | 5 | 7 | 9 | 13 | — | — |
| 7 | 1 | 5 | 7 | 9 + 10 | 13 | — | — |
| 8 | 1 | 5 | 7 | 9 | 13 | — | — |
| 9 | 3 | 7 | 8 | 9 | 13 | — | — |
| 10 | 3 | 7 | 8 | 9 | 13 | — | — |
| 11 | 4 | 7 | 8 | 9 | 13 | — | — |
| 12 | 1 | 5 | 7 | 11 | 13 | — | — |
| 13 | 1 | 5 | 7 | 11 | 13 | — | — |
| 14 | 1 | 5 | 7 | 11 | 13 | — | — |
| 15 | 1 | 5 | 7 | 11 | 13 | — | — |
| 16 | 1 | 5 | 7 | 12 | 13 | — | — |
| 17 | 1 | 5 | 7 | 9 + 10 | 13 | 11 | — |
| 18 | 1 | 5 | 7 | 9 + 10 | 13 | 11 | — |
| 19 | 1 | 5 | 7 | 9 + 10 | 13 | 11 | — |
| 20 | 3 | 7 | 8 | 9 | 13 | — | 14 |
| 21 | 3 | 7 | 8 | 9 | 13 | — | 14 |
| 22 | 3 | 7 | 8 | 9 | 13 | — | 14 |

TABLE II

| Example | MW A/B | MW B/C | Mol A/B | Mol B/C | Mol SiH/ SiOH | Mol SiOR/ SiOH |
|---|---|---|---|---|---|---|
| | | | Ratio | | | |
| 1 | 56 | 3 | 0.04 | 0.35 | — | 4 |
| 2 | 56 | 3 | 0.02 | 0.35 | — | 4 |
| 3 | 56 | 3 | 0.02 | 0.54 | — | 4 |
| 4 | 40 | 3 | 0.04 | 0.70 | — | 4 |
| 5 | 40 | 3 | 0.04 | 0.70 | — | 4 |
| 6 | 40 | 3 | 0.03 | 0.35 | — | 4 |
| 7 | 40 | 3 | 0.04 | 0.52 | — | 4 |
| 8 | 40 | 3 | 0.04 | 0.70 | — | 4 |
| 9 | 80 | 3 | 0.05 | 0.54 | — | 3 |
| 10 | 80 | 3 | 0.04 | 0.54 | — | 3 |
| 11 | 57 | 3 | 0.04 | 0.54 | — | 3 |
| 12 | 40 | 3 | 0.13 | 0.18 | 2 | — |
| 13 | 40 | 3 | 0.06 | 0.35 | 2 | — |
| 14 | 40 | 3 | 0.05 | 0.35 | 2 | — |
| 15 | 40 | 3 | 0.04 | 0.70 | 2 | — |
| 16 | 40 | 3 | 0.04 | 0.70 | 2 | — |
| 17 | 40 | 3 | 0.07 | 0.65 | — | 8 |
| 18 | 40 | 3 | 0.07 | 0.65 | — | 2 |
| 19 | 40 | 3 | 0.07 | 0.65 | — | 8 |
| 20 | 80 | 3 | 0.07 | 0.90 | — | 14 |
| 21 | 80 | 3 | 0.05 | 0.54 | — | 28 |
| 22 | 80 | 3 | 0.04 | 2.00 | — | 27 |

All the examples were tested for viscosity and Shore A hardness (using a durometer according to DIN 53,505). They were also tested for elongation (%), tensile strength (MPa) and mechanical strength (H=high; M=medium; L=low) according to DIN 53,504, Die S2. The results are given below in Table III.

TABLE III

| Example | Viscosity mPa.s | Durometer Shore A | Elongation % | Tensile MPa | Mechanical Strength |
|---|---|---|---|---|---|
| 1 | 5,660 | 44 | 185 | 4.7 | H |
| 2 | 1,700 | 45 | 200 | 5.3 | H |
| 3 | 3,500 | 44 | 200 | 5.6 | H |
| 4 | 2,530 | 45 | 185 | 4.5 | H |
| 5 | 2,700 | 42 | 200 | 5.2 | H |
| 6 | 1,000 | 48 | 130 | 3.7 | H |
| 7 | 1,900 | 48 | 180 | 5.2 | H |
| 8 | 1,530 | 48 | 185 | 3.9 | H |
| 9 | 1,640 | 40 | 200 | 3.6 | H |
| 10 | 1,000 | 45 | 180 | 4.5 | H |
| 11 | 750 | 48 | 170 | 3.7 | H |
| 12 | 21,400 | 31 | 220 | 2.1 | H |
| 13 | 13,000 | 38 | 200 | 2.2 | H |
| 14 | 7,670 | 38 | 170 | 2.4 | H |
| 15 | 6,500 | 35 | 140 | 1.4 | M |
| 16 | 3,600 | 33 | 190 | 2.3 | H |
| 17 | 1,980 | 41 | 190 | 4.2 | H |
| 18 | 2,020 | 40 | 200 | 4.5 | H |
| 19 | 1,850 | 44 | 185 | 4.0 | H |
| 20 | 1,000 | 48 | 150 | 4.0 | H |
| 21 | 360 | 56 | 150 | 4.2 | H |
| 22 | 460 | 56 | 150 | 4.9 | H |

In addition to the results given above, Examples 17, 18 and 19 (using component F) showed an improved cure time. Examples 20, 21 and 22 using component (G) was also tested for tear strength and showed a great improvement (a result of around 10 kN/m) over examples not using component (G).

COMPARATIVE EXAMPLES C1 to C15

Comparative examples were prepared in the same way as Examples above, with details of composition and ratios given in Tables IV and V and results of testing in Table VI, wherein NA means not applicable.

TABLE IV

| Example | Components | | | | | | |
|---|---|---|---|---|---|---|---|
| | A | B | C | D | E | F | G |
| | Ingredients | | | | | | |
| C1 | 2 | 6 | 5 | 9 | 13 | — | — |
| C2 | 1 | 5 | 8 | 9 | 13 | — | — |
| C3 | 1 | 5 | — | 11 | 13 | — | — |
| C4 | 3 | 5 | — | 11 | 13 | — | — |
| C5 | 6 | 5 | — | 11 | 13 | — | — |
| C6 | 2 | 5 | — | 9 | 13 | — | — |
| C7 | 1 | 7 | — | 9 | 13 | — | — |
| C8 | 3 | 8 | — | 9 | 13 | — | — |
| C9 | 1 | — | — | 11 | 13 | — | — |
| C10 | 3 | — | — | 11 | 13 | — | — |
| C11 | 6 | — | — | 11 | 13 | — | — |
| C12 | 5 | — | — | 11 | 13 | — | — |
| C13 | 3 | — | — | 9 | 13 | — | — |
| C14 | 3 | — | — | 9 | 13 | — | — |
| C15 | 3 | — | — | 9 | 13 | — | — |

TABLE V

| Example | Ratio | | | | | |
|---|---|---|---|---|---|---|
| | MW A/B | MW B/C | Mol A/B | Mol B/C | Mol SiH/ SiOH | Mol SiOR/ SiOH |
| C1 | 4 | 14 | 0.04 | 0.35 | — | 4 |
| C2 | 40 | 8 | 0.04 | 0.38 | — | 4 |
| C3 | 40 | NA | 0.03 | NA | 1 | — |
| C4 | 28 | NA | 0.03 | NA | 1 | — |
| C5 | 14 | NA | 0.03 | NA | 1 | — |
| C6 | 56 | NA | 0.04 | NA | — | 4 |
| C7 | 114 | NA | 0.04 | NA | — | 4 |
| C8 | 180 | NA | 0.04 | NA | — | 4 |
| C9 | NA | NA | NA | NA | 1 | — |
| C10 | NA | NA | NA | NA | 1 | — |
| C11 | NA | NA | NA | NA | 1 | — |
| C12 | NA | NA | NA | NA | 1 | — |
| C13 | NA | NA | NA | NA | — | 20 |
| C14 | NA | NA | NA | NA | — | 40 |
| C15 | NA | NA | NA | NA | — | 60 |

TABLE VI

| Example | Viscosity mPa.s | Durometer Shore A | Elongation % | Tensile MPa | Mechanical Strength |
|---|---|---|---|---|---|
| C1 | 1,160 | 28 | 120 | 0.85 | L |
| C2 | 1,780 | 39 | 80 | 1.00 | L |
| C3 | 9,200 | 39 | 90 | 0.70 | L |
| C4 | 1,700 | 42 | 50 | 0.40 | L |
| C5 | 360 | 44 | 30 | 0.40 | L |
| C6 | 57,000 | 27 | 180 | 1.20 | L |
| C7 | 22,000 | 30 | 180 | 1.60 | L |
| C8 | 4,000 | 23 | 225 | 1.50 | L |
| C9 | 50,000 | 6 | 1,200 | 0.25 | L |
| C10 | 13,800 | 8 | 330 | 0.21 | L |
| C11 | 2,700 | 20 | 150 | 0.20 | L |
| C12 | 90 | 28 | 40 | 0.28 | L |
| C13 | 13,000 | 20 | 100 | 0.30 | L |
| C14 | 11,000 | 40 | 110 | 0.33 | L |
| C15 | 9,400 | 17 | 100 | 0.23 | L |

Comparative results for prior art systems requires the use of extremely high viscosity gum-like polymers and large amounts of solvents (up to 70% of toluene). Where lower viscosity polymers are used, and thus less solvent is required, the resulting mechanical and elastomeric properties tend to be less desirable (e.g. very low elongation).

That which is claimed is:

1. A siloxane-based elastomer-forming composition comprising (A) a first α,ω-dihydroxyl polydiorganosiloxane, (B) a second α,ω-dihydroxyl polydiorganosiloxane, (C) a third α,ω-dihydroxyl polydiorganosiloxane, (D) an organosilicon compound having at least three silicon-bonded substituents selected from the group consisting of hydrogen and alkoxy groups and (E) a condensation catalyst, wherein the number average molecular weight ratio of A/B is in the range of 20 to 80, the number average molecular weight ratio of B/C is in the range of 1 to 6, the molar ratio of A/B is in the range of 0.01 to 0.15 and the molar ratio of B/C is in the range of 0.2 to 2.

2. A composition according to claim 1 wherein components (A), (B), and (C) are α,ω-dihydroxyl polydiorganosiloxanes having an average general formula

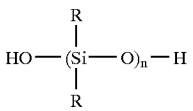

wherein R denotes a hydrocarbon group and n is an integer sufficient to define each component as a polydiorganosiloxane.

3. A composition according to claim 2 wherein R is selected from the group consisting of alkyl groups having up to 8 carbon atoms and aryl groups having up to 8 carbon atoms.

4. A composition according to claim 3 wherein R is a methyl group.

5. A composition according to claim 1 wherein the number average molecular weight ratio of A/B is in the range of 30 to 50 and the number average molecular weight ratio of B/C is in the range of 2 to 4.

6. A composition according to claim 1 wherein component (A) has a number average molecular weight in the range of 20,000 to 500,000 and component (C) has a number average molecular weight in the range of 200 to 3000.

7. A composition according to claim 1 wherein the molar ratio of A/B is in the range of 0.01 to 0.1 and the molar ratio of B/C is in the range of 0.5 to 1.5.

8. A composition according to claim 1 wherein component (D) is selected from the group consisting of silanes and siloxanes.

9. A composition according to claim 8 wherein component (D) has the following average formula

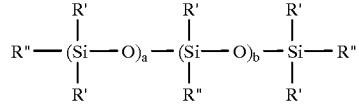

wherein R' is a hydrocarbon group having up to 8 carbon atoms, R" is selected from the group consisting of hydrogen and R', provided that at least 3 R" groups are hydrogen atoms, a is an integer greater than or equal to 0 and b is a positive integer greater than or equal to 1.

10. A composition according to claim 8 wherein component (D) has at least three silicon-bonded alkoxy groups.

11. A composition according to claim 10 wherein component (D) is selected from the group consisting of R'Si(OR')$_3$ and Si(OR')$_4$, wherein R' is a hydrocarbon group having up to 8 carbon atoms.

12. A composition according to claim 10 wherein component (D) is a resinous siloxane consisting of monovalent siloxane units of the formula $R''_3SiO_{1/2}$ and tetravalent siloxane units of the formula $SiO_{4/2}$, and the ratio of monovalent siloxane units to tetravalent siloxane units is in the range of 0.6/1 to 1.5/1 and where R" is selected from hydrogen or hydrocarbon groups of 1 to 8 carbon atoms.

13. A composition according to claim 1 wherein the ratio of silicon-bonded hydrogen and alkoxy groups in component (D) to silanol groups in components (A), (B) and (C) is in the range of 1/1 to 10/1.

14. A composition according to claim 13 wherein component (D) contains silicon-bonded hydrogen atoms and the ratio of silicon-bonded hydrogen atoms in component (D) to silanol groups in components (A), (B) and (C) is in the range of 1/1 to 5/1.

15. A composition according to claim 13 wherein component (D) contains silicon-bonded alkoxy groups and the ratio of silicon-bonded alkoxy groups in component (D) to silanol groups in components (A), (B) and (C) is in the range of 2/1 to 10/1.

16. A composition according to claim 1 wherein component (E) is a metal salt of a carboxylic acid.

17. A composition according to claim 16 wherein component (E) is selected from the group consisting of tin salts of octoates, tin salts of actetates, lead salts of octoates and lead salts of acetates.

18. A composition according to claim 1 wherein component (D) is an organosilicon compound having silicon-bonded alkoxy groups and wherein the composition also comprises (F) an organosilicon compound having at least three silicon-bonded hydrogen atoms, wherein said component (F) is present at a concentration of 1 to 2% by weight based on the total weight of components (A), (B), (C), and (D).

19. A composition according to claim 1 wherein component (D) is an organosilicon compound having silicon-bonded alkoxy groups and wherein the composition also comprises (G) an organosilicon resin consisting of monovalent siloxane units of the formula $R^a_3SiO_{1/2}$ and tetravalent siloxane units of the formula $SiO_{4/2}$ in a ratio of from 0.4/1 to 1.2/1, wherein $R^a$ is selected from the group consisting of alkyl groups having up to 6 carbon atoms and hydroxyl groups, provided that no more than about 5% by weight hydroxyl groups are present on said resin (G) and wherein said component (G) is present at a concentration greater than 10% by weight based on the total weight of components (A), (B), (C), and (D).

* * * * *